(12) United States Patent
Hara et al.

(10) Patent No.: US 8,129,453 B2
(45) Date of Patent: Mar. 6, 2012

(54) METHOD FOR PREPARING THERMOPLASTIC ELASTOMER COMPOSITION

(75) Inventors: Yuichi Hara, Hiratsuka (JP); Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/107,268

(22) Filed: May 13, 2011

(65) Prior Publication Data

US 2011/0218281 A1    Sep. 8, 2011

Related U.S. Application Data

(62) Division of application No. 12/721,955, filed on Mar. 11, 2010, now abandoned.

(30) Foreign Application Priority Data

Mar. 13, 2009  (JP) .................................. 2009-061879

(51) Int. Cl.
*C08K 5/1515*   (2006.01)
*C08L 77/00*    (2006.01)
(52) U.S. Cl. ......... 524/114; 524/169; 525/178; 525/426
(58) Field of Classification Search .................. 524/114, 524/169; 525/178, 426
See application file for complete search history.

(56) References Cited

U.S. PATENT DOCUMENTS

| | | | |
|---|---|---|---|
| 5,910,544 A | 6/1999 | Ozawa et al. | |
| 5,948,503 A * | 9/1999 | Yamamoto et al. | 428/113 |
| 6,079,465 A | 6/2000 | Takeyama et al. | |
| 6,274,697 B1 * | 8/2001 | Zahr | 528/310 |
| 2008/0275187 A1 | 11/2008 | Tsou et al. | |
| 2009/0038729 A1 | 2/2009 | Soeda et al. | |

FOREIGN PATENT DOCUMENTS

| | | |
|---|---|---|
| CN | 101296997 | 10/2008 |
| JP | 10-25375 A | 1/1989 |
| JP | 03265662 A | 11/1991 |
| JP | 08-216286 A | 8/1996 |
| JP | 8-259741 A | 10/1996 |
| JP | 10-114840 A | 5/1998 |
| JP | 2000-160024 A | 6/2000 |

OTHER PUBLICATIONS

Machine translation of JP 08-216286. Aug. 1996.
Office Action in counterpart Chinese application No. 201010133981.9 dated Sep. 8, 2011.

* cited by examiner

*Primary Examiner* — Milton I Cano
*Assistant Examiner* — John Uselding
(74) *Attorney, Agent, or Firm* — Connolly Bove Lodge & Hutz LLP

(57) ABSTRACT

Provided is a thermoplastic elastomer composition, which includes a halogenated isoolefin/para-alkylstyrene copolymer rubber dispersed in a polyamide resin in order to improve the fatigue durability of a polyamide resin, while maintaining high flowability of the polyamide. A thermoplastic elastomer composition comprising a continuous phase composed of a modified polyamide resin (A) and a dispersed phase composed of a halogenated isoolefin/para-alkylstyrene copolymer rubber (B) is provided. The modified polyamide resin (A) is a resin obtained by melt-kneading 100 parts by weight of a polyamide resin (C) with not less than 0.05 part by weight and less than 3 parts by weight a compound (D), such as a monofunctional epoxy compound, capable of binding to a terminal amino group of the polyamide resin at a temperature not lower than the melting point of the polyamide resin (C). The composition can be used as an inner liner of a pneumatic tire.

10 Claims, No Drawings

METHOD FOR PREPARING THERMOPLASTIC ELASTOMER COMPOSITION

CROSS REFERENCE TO RELATED APPLICATION

This application is a Divisional of application Ser. No. 12/721,955, filed on Mar. 11, 2010, now abandoned, and for which priority is claimed under 35 U.S.C. §120; and this application claims priority of Application No. 2009-061879 filed in Japan on Mar. 13, 2009 under 35 U.S.C. §119; the entire contents of all are hereby incorporated by reference.

TECHNICAL FIELD

The present invention relates to a thermoplastic elastomer composition including a polyamide resin and a halogenated isoolefin/para-alkylstyrene copolymer rubber. More particularly, the present invention relates to a thermoplastic elastomer composition, in which a halogenated isoolefin/para-alkylstyrene copolymer rubber is dispersed in a polyamide resin, which is a matrix, in order to improve the cold temperature durability (cyclic fatigue endurance) of the polyamide resin. The present invention further relates to a pneumatic tire using the thermoplastic elastomer composition in an inner liner.

BACKGROUND ART

There is known a thermoplastic elastomer composition superior in balance between air barrier property and flexibility comprising a specific thermoplastic resin matrix in which a specific rubber elastomer ingredient is dispersed as a discontinuous phase. See Japanese Unexamined Patent Publication No. 8-259741.

Further, it is also known that by having a melt viscosity ($\eta_m$) of a thermoplastic resin ingredient and a melt viscosity ($\eta_d$) of a rubber elastomer ingredient in the thermoplastic elastomer composition and a difference in the solubility parameters of the elastomer ingredient and thermoplastic resin ingredient ($\Delta SP$) satisfy a specific relationship, a high elastomer ingredient ratio is achieved and thereby a thermoplastic elastomer composition much richer in flexibility and superior in gas barrier property is obtained and further a pneumatic tire using the same as a gas barrier layer. See Japanese Unexamined Patent Publication No. 10-25375.

Further, there is also known a thermoplastic elastomer composition comprising a thermoplastic elastomer having a thermoplastic resin as a matrix and a rubber composition as a dispersed phase in which a barrier resin composition having a phase structure dispersed in a flat shape is introduced so that the gas barrier property is greatly improved and flexibility, oil resistance, cold resistance, and heat resistance are given. See Japanese Unexamined Patent Publication No. 10-114840.

Further, there is also known a thermoplastic elastomer composition comprising an aliphatic polyamide resin modified by a layered silicate into which an acid anhydride modified ethylene-based modifying polymer is blended. See Japanese Unexamined Patent Publication No. 2000-160024.

SUMMARY OF INVENTION

Technical Problem

Regarding a dynamically cross-linked thermoplastic elastomer composition including a polyamide resin and a halogenated isoolefin/para-alkylstyrene copolymer rubber, it has been known that the more finely the halogenated isoolefin/para-alkylstyrene copolymer rubber is dispersed, the better the durability becomes, and that the higher volume fraction the halogenated isoolefin/para-alkylstyrene copolymer rubber is loaded to, the better the durability becomes. However, since halogenated isoolefin/para-alkyl styrene copolymer rubber reacts directly with polyamide resin, the more finely the halogenated isoolefin/para-alkylstyrene copolymer rubber is dispersed, the more reaction with the polyamide resin takes place, and the higher volume fraction the halogenated isoolefin/para-alkylstyrene copolymer rubber is loaded to, the more reaction with the polyamide resin takes place, which decreases flowability of the polyamide resin in a molten state which results in a significantly poorer film forming property.

An object of the present invention is to provide a thermoplastic elastomer composition, which includes a halogenated isoolefin/para-alkyl styrene copolymer rubber dispersed in a polyamide resin which is a matrix, and which maintains high flowability allowing good film formation, even if a halogenated isoolefin/para-alkylstyrene copolymer rubber is finely dispersed and mixed at a high rate.

Solution to Problem

An aspect of the present invention is a thermoplastic elastomer composition comprising a continuous phase composed of a modified polyamide resin (A) and a dispersed phase composed of a halogenated isoolefin/para-alkylstyrene copolymer rubber (B), wherein the modified polyamide resin (A) is a resin obtained by melt-kneading 100 parts by weight of a polyamide resin (C) with not less than 0.05 part by weight and less than 3 parts by weight of a compound (D) capable of binding to a terminal amino group of the polyamide resin at a temperature of not lower than the melting point of the polyamide resin (C).

According to another aspect of the present invention, the compound (D) capable of binding to a terminal amino group of the polyamide resin is preferably a monofunctional epoxy compound.

Further, according to another aspect of the present invention, the polyamide resin (C) is preferably at least one selected from the group consisting of nylon 11, nylon 12, nylon 6, nylon 66, nylon 6/66, nylon 6/12, nylon 6/10, nylon 4/6, nylon 6/66/12 and aromatic nylons.

Further, according to another aspect of the present invention, the halogenated isoolefin/para-alkylstyrene copolymer rubber (B) is preferably a brominated isobutylene/para-methylstyrene copolymer rubber.

Further, according to another aspect of the present invention, the halogenated isoolefin/para-alkylstyrene copolymer rubber (B) is preferably dynamically cross-linked.

Further, according to another aspect of the present invention, the amount of the halogenated isoolefin/para-alkylstyrene copolymer rubber (B) is preferably 57 to 70 parts by weight based on 100 parts by weight of the total of the polyamide resin (C) and the halogenated isoolefin/para-alkylstyrene copolymer rubber (B).

The thermoplastic elastomer composition according to another aspect of the present invention preferably further comprises a plasticizer (E) in an amount of 5 to 20 parts by weight based on 100 parts by weight of the total of the polyamide resin (C) and the plasticizer (E).

Further, according to another aspect of the present invention, the plasticizer (E) is preferably butylbenzenesulfonamide.

Further, according to another aspect of the present invention, the cross-linking agent used for the dynamic cross-linking is preferably zinc oxide.

Further, according to another aspect of the present invention, the cross-linking agent used for the dynamic cross-linking is preferably a secondary amine.

Another aspect of the present invention is a pneumatic tire having an inner liner comprising the thermoplastic elastomer composition.

Advantageous Effects of Invention

According to the present invention, a thermoplastic elastomer composition, which can maintain high flowability allowing good film formation, even if a halogenated isoolefin/para-alkylstyrene copolymer rubber is finely dispersed and mixed at a high rate, can be provided by using a modified polyamide resin obtained by melt-kneading in advance 100 parts by weight of a polyamide resin with not less than 0.05 part by weight and less than 3 parts by weight of a compound capable of binding to a terminal amino group of the polyamide resin.

Furthermore, a pneumatic tire using the thermoplastic elastomer composition according to the present invention in an inner liner is superior in low temperature fatigue durability.

DESCRIPTION OF EMBODIMENTS

The thermoplastic elastomer composition according to the present invention comprises a modified polyamide resin (A) and a halogenated isoolefin/para-alkylstyrene copolymer rubber (B).

The modified polyamide resin (A) to be used according to the present invention is a resin obtained by melt-kneading 100 parts by weight of a polyamide resin (C) with not less than 0.05 part by weight and less than 3 parts by weight of a compound (D) capable of binding to a terminal amino group of a polyamide resin at a temperature of not lower than the melting point of the polyamide resin (C).

As a polyamide resin (C), nylon 11, nylon 12, nylon 6, nylon 66, nylon 6/66, nylon 6/12, nylon 6/10, nylon 4/6, nylon 6/66/12, or aromatic nylons can be used, without limitation thereto, singly or in combination. Among them, nylon 6 and nylon 6/66 are preferable in view of fatigue resistance and a gas barrier property.

Examples of a compound (D) capable of binding to a terminal amino group of a polyamide resin include a monofunctional epoxy compound, a compound having an isocyanate group, a compound having an anhydride group, and a compound having a halogenated alkyl group. A monofunctional epoxy compound is preferable from a viewpoint of the reactivity with a terminal amino group of a polyamide resin.

Examples of a monofunctional epoxy compound include ethylene oxide, epoxypropane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, 1-butoxy-2,3-epoxypropane, 1-allyloxy-2,3-epoxypropane, poly(ethyleneglycol) butyl glycidyl ether, 2-ethylhexyl glycidyl ether, phenyl glycidyl ether, and p-sec-butylphenyl glycidyl ether. From a viewpoint of the compatibility with a polyamide resin, epoxy compounds having 3 to 20, preferably 3 to 13, carbon atoms and having either or both of an ether group and a hydroxyl group are particularly preferable.

Although there is no particular restriction on a method for melt-kneading a polyamide resin (C) with a compound (D) capable of binding to a terminal amino group of the polyamide resin, the polyamide resin (C) and the compound (D) capable of binding to a terminal amino group of the polyamide resin may be, for example, charged into a twin screw kneader and melt-kneaded at a temperature not lower than the melting point of the polyamide resin (C), preferably higher than the melting point by at least 20° C., e.g. between 220 and 250° C. The melt-kneading time is, for example, between 1 and 10 minutes, and preferably between 2 and 5 minutes.

In case a monofunctional epoxy compound is melt-kneaded as a compound (D) capable of binding to a terminal amino group of the polyamide resin, a monofunctional epoxy compound represented by the following formula (1) bonds to a terminal amino group of the polyamide resin (C).

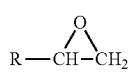
(1)

For example, the terminal amino group changes as follows.

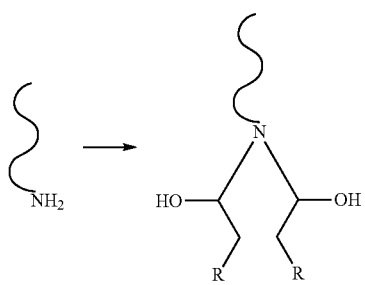
(2)

Since a part of or all of the terminal amino groups of the polyamide resin (C) changes to another group as a result of the reaction, high flowability can be maintained allowing good film formation, even if a halogenated isoolefin/para-alkylstyrene copolymer rubber (B) is mixed at a high rate.

The amount of the compound (D) capable of binding to a terminal amino group of a polyamide resin to be used for modifying the polyamide resin (C) is not less than 0.05 part by weight and less than 3 parts by weight based on 100 parts by weight of the polyamide resin (C), and preferably between 0.1 part by weight and 1 part by weight. If the amount of the compound (D), capable of binding to a terminal amino group of a polyamide resin, is too low, flowability is undesirably low, when a halogenated isoolefin/para-alkyl styrene copolymer rubber (B) is mixed at a high rate. Reversely, if the amount is too high, the low temperature durability (cyclic fatigue resistance) of the polyamide resin is deteriorated, which is also undesirable.

A halogenated isoolefin/para-alkylstyrene copolymer rubber (B) to be used according to the present invention can be produced by halogenating a copolymer of an isoolefin and a para-alkylstyrene. There are no particular restrictions on the mixture ratio, degree of polymerization, average molecular weight, polymerization mode (a block-copolymer, a random copolymer, etc.), viscosity, type of a halogen atom, etc., of a halogenated isoolefin and the para-alkylstyrene, which can be selected freely in accordance with required physical properties for a thermoplastic elastomer composition. Examples of an isoolefin constituting the halogenated isoolefin/para-alkylstyrene copolymer rubber (B) include isobutylene, isopentene and isohexene. Isobutylene is preferable. Examples of a para-alkylstyrene constituting the halogenated isoolefin/para-alkylstyrene copolymer rubber (B) include para-methylstyrene, para-ethylstyrene, para-propylstyrene and para-butylstyrene. Para-methylstyrene is preferable. Examples of a halogen constituting the halogenated isoolefin/para-alkylstyrene copolymer rubber (B) include fluorine, chlorine, bromine and iodine. Bromine is preferable. An especially preferable halogenated isoolefin/para-alkylstyrene copolymer rubber is para-methylstyrene polyisobutylene copolymer rubber.

A brominated isobutylene para-methylstyrene copolymer rubber is yielded by brominating an isobutylene para-methylstyrene copolymer rubber having the recurring units represented by the formula (3):

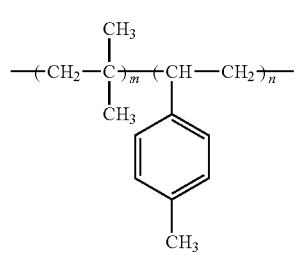
(3)

to have typically the recurring units represented by the formula (4).

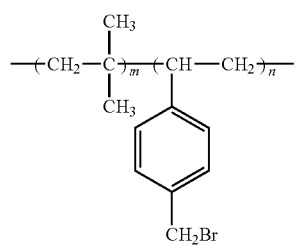
(4)

A brominated isobutylene para-methylstyrene copolymer rubber is available from ExxonMobil Chemical Company under the trade name of Exxpro®.

The amount of a halogenated isoolefin/para-alkylstyrene copolymer rubber (B) in a thermoplastic elastomer composition is preferably 57 to 70 parts by weight based on 100 parts by weight of the total of the polyamide resin (C) and the halogenated isoolefin/para-alkylstyrene copolymer rubber (B), and more preferably 57 to 68 parts by weight. If the content of a halogenated isoolefin/para-alkylstyrene copolymer rubber (B) is too low, the low temperature durability becomes poor, and reversely, if it is too high, the flowability in a molten state decreases and significantly deteriorates the film formation property.

In the thermoplastic elastomer composition according to the present invention, a modified polyamide resin (A) forms a continuous phase and a halogenated isoolefin/para-alkylstyrene copolymer rubber (B) forms a dispersed phase. Such phase structure can be obtained by selecting appropriately the contents and the viscosities of the modified polyamide resin (A) and the halogenated isoolefin/para-alkylstyrene copolymer rubber (B). Theoretically, with a higher content of the modified polyamide resin (A), and a lower viscosity thereof, the modified polyamide resin (A) can form a continuous phase more easily.

The thermoplastic elastomer composition according to the present invention preferably further comprises a plasticizer (E). A plasticizer imparts plasticity to a rubber and a resin to assist mixture and dispersion of another ingredient, to facilitate processing such as extrusion, and to increase the tackiness of green rubber facilitating processing. Examples of a usable plasticizer include dibutyl phthalate, dioctyl phthalate, dioctyl adipate, dibutylglycol adipate, dibutylcarbitol adipate, dioctyl sebacate, tricresyl phosphate, cresyl diphenyl phosphate, tributyl phosphate, trioctyl phosphate, tributoxydiethyl phosphate, and butylbenzenesulfonamide; and butylbenzenesulfonamide is preferable among them. The amount of the plasticizer (E) is preferably 5 to 20 parts by weight based on 100 parts by weight of the total of the polyamide resin (C) and the plasticizer (E), and more preferably 5 to 15 parts by weight. If the amount of the plasticizer is too low, the advantage of the use of the plasticizer cannot be obtained; and reversely, in case it is too high, such adverse effects can take place as deterioration in the gas barrier property of the polyamide resin (C) and decrease in the durability caused by coarser dispersion of the rubber due to lowered viscosity.

The halogenated isoolefin/para-alkylstyrene copolymer rubber should preferably be dynamically cross-linked. Through the dynamic cross-linking, the continuous phase and the dispersed phase of a thermoplastic elastomer composition can be stabilized together. The dynamic cross-linking can be performed by melt-kneading the halogenated isoolefin/para-alkylstyrene copolymer rubber together with a cross-linking agent.

Examples of a cross-linking agent to be used for the dynamic cross-linking include zinc oxide, stearic acid, zinc stearate, magnesium oxide, m-phenylene bismaleimide, an alkylphenol resin or a halogenated resin thereof, and a secondary amine. Examples of the secondary amine to be used as a cross-linking agent include N-(1,3-dimethylbutyl)-N'-phenyl-p-phenylenediamine and polymerized 2,2,4-trimethyl-1,2-dihydroquinoline. Especially, zinc oxide, stearic acid, zinc stearate and N-(1,3-dimethylbutyl)-N'-phenyl-p-phenylenediamine are used preferably as a cross-linking agent for the dynamic cross-linking.

The amount of the cross-linking agent is preferably 4 to 12 parts by weight based on 100 parts by weight of the halogenated isoolefin/para-alkylstyrene copolymer rubber (B), and more preferably 6 to 9 parts by weight. In case the amount of the cross-linking agent is too low, the dynamic cross-linking becomes insufficient and fine dispersion of the halogenated isoolefin/para-alkylstyrene copolymer rubber (B) cannot be stabilized leading to decrease in the durability. Reversely, if the amount of the cross-linking agent is too high, scorching may occur during kneading or processing, or foreign matter may be generated in the film.

A thermoplastic elastomer composition according to the present invention can be produced by melt-kneading a modified polyamide resin (A) and a halogenated isoolefin/para-alkylstyrene copolymer rubber (B) at a temperature not lower than the melting point of the modified polyamide resin (A). Although the temperature for melt-kneading may be a temperature not lower than the melting point of the modified polyamide resin, it should be preferably higher than the melting point of the modified polyamide resin by 20° C., for example, between 180 and 300° C. The melt-kneading time is usually 1 to 10 minutes, and preferably 1 to 5 minutes.

As a more precise example, a mixture of a plasticizer (E) and a compound (D) capable of binding to a terminal amino group of a polyamide resin is kneaded with a polyamide resin (C) in a twin screw kneader for 1 to 10 minutes at a preset temperature between 220 and 250° C. to produce a modified polyamide resin (A); then a halogenated isoolefin/para-alkylstyrene copolymer rubber (B) and the modified polyamide resin (A) are charged into a twin screw kneader at a preset temperature between 220 and 250° C. until the halogenated isoolefin/para-alkylstyrene copolymer rubber (B) is dispersed; and then a cross-linking agent is added to cross-link dynamically the halogenated isoolefin/para-alkylstyrene copolymer rubber (B). Finally other ingredients are added to yield a thermoplastic elastomer composition.

Alternatively, a mixture of a plasticizer (E) and a compound (D) capable of binding to a terminal amino group of a polyamide resin is kneaded with a polyamide resin (C) in a twin screw kneader for 1 to 10 minutes at a preset temperature between 220 and 250° C. to produce a modified polyamide resin (A); and the produced modified polyamide resin (A), a halogenated isoolefin/para-alkylstyrene copolymer rubber (B) and other ingredients are kneaded in a twin screw kneader for 1 to 10 minutes at a preset temperature between 220 and 250° C. to yield a thermoplastic elastomer composition.

Alternatively, a halogenated isoolefin/para-alkylstyrene copolymer rubber (B) is pelletized by a rubber pelletizer, and separately a mixture of a polyamide resin (A) and a plasticizer (F) is prepared by kneading a polyamide resin (A) and a plasticizer (F) in a twin screw kneader for 1 to 10 minutes at a preset temperature between 220 and 250° C. Then, the pellet of the halogenated isoolefin/para-alkylstyrene copolymer rubber (B) and the mixture of the polyamide resin (A) and the plasticizer (F) are charged into a twin screw kneader at a preset temperature between 220 and 250° C.; and, when the halogenated isoolefin/para-alkylstyrene copolymer rubber (B) is dispersed, a cross-linking agent (E) is added to cross-link dynamically the halogenated isoolefin/para-alkylstyrene copolymer rubber (B). Next, a compound (D) capable of binding to a terminal amino group of a polyamide resin is added to be reacted with the polyamide, and finally an antioxidant is added to yield a thermoplastic elastomer composition.

Alternatively, a polyamide resin (C) is charged and molten in a twin screw kneader; then a plasticizer (E) is added; and then a halogenated isoolefin/para-alkylstyrene copolymer rubber (B) is added. When the halogenated isoolefin/para-alkylstyrene copolymer rubber (B) is dispersed, a cross-linking agent is added to cross-link dynamically the halogenated isoolefin/para-alkylstyrene copolymer rubber (B); and then a compound (D) capable of binding to a terminal amino group of a polyamide resin is added; followed by additional melt-kneading to yield a thermoplastic elastomer composition.

A thermoplastic elastomer composition according to the present invention may comprise, in addition to the aforedescribed ingredients, such various conventional additives used for resin or rubber compositions, as reinforcing materials (fillers), e.g. carbon black or silica, vulcanizing or cross-linking agents, vulcanizing or cross-linking accelerators, plasticizers, various types of oils, and antioxidants. The contents of such additives may be identical to conventionally applicable contents, insofar as the additives should not conflict with the purpose of the present invention.

The thermoplastic elastomer composition according to the present invention can be converted to a film by a T-die extruder or a blown film machine. Since the film has a superior gas barrier property, heat resistance, and fatigue durability, it can be utilized as an inner layer for a pneumatic tire.

Further, a film of the thermoplastic elastomer composition according to the present invention can be laminated to a laminate with a sheet of a rubber composition containing a diene component. Examples of a rubber constituting a rubber composition containing a diene component to be used for the laminate of the film of the thermoplastic elastomer composition according to the present invention and a sheet of a rubber composition containing a diene component include a natural rubber, an emulsion polymerization styrene-butadiene rubber, a solution polymerization styrene-butadiene rubber, a high-cis butadiene rubber, a low-cis butadiene rubber, an isoprene rubber, an acrylonitrile-butadiene rubber, a hydrogenated nitrile rubber, a butyl rubber, a halogenated butyl rubber, and a chloroprene rubber; and a halogenated butyl rubber is preferable among them, because it can be directly bonded by heat to a film of the thermoplastic elastomer composition yielded according to the present invention. The content of a halogenated butyl rubber in polymer components of the rubber composition is preferably 30 to 100% by weight. If the content of a halogenated butyl rubber is low, it cannot be directly bonded by heat to a film of the thermoplastic elastomer composition yielded according to the present invention, and therefore should be bonded cumbersomely using an adhesive.

A rubber composition containing a diene component may comprise, in addition to the afore-described ingredients, such various conventional additives used for resin or rubber compositions, as reinforcing materials (fillers), e.g. carbon black or silica, vulcanizing or cross-linking agents, vulcanizing or cross-linking accelerators, plasticizers, various types of oils, and antioxidants. The contents of such additives may be identical to conventionally applicable contents, insofar as the additives should not conflict with the purpose of the present invention.

The pneumatic tire according to the present invention is a pneumatic tire using a thermoplastic elastomer composition produced according to the afore-described production process in an inner liner thereof. More particularly, it is a pneumatic tire having an inner liner using the thermoplastic elastomer composition film or the laminate. The tire may be produced by a conventional process. For example, a thermoplastic elastomer composition according to the present invention is extruded to a film having pre-determined width and thickness, which is then placed cylindrically onto a tire building drum as an inner liner. Thereon are laminated successively various components conventionally used for tire production, such as a carcass layer, a belt layer, and a tread layer composed of green rubber, and the laminate is removed from the drum as a green tire. The green tire is then heated for vulcanization according to a conventional process to complete a desired pneumatic tire.

A thermoplastic elastomer composition according to the present invention can also be used for producing a hose. A conventional process can be applied for producing a hose using a thermoplastic elastomer composition according to the present invention. For example, a hose can be produced as follows: using pellets of a thermoplastic elastomer composition according to the present invention, the thermoplastic elastomer composition is extruded by a resin extruder with a cross-head extrusion system onto a mandrel to form an inner hose, on which an outer layer of the inner hose may be additionally formed by extruding another thermoplastic elastomer composition according to the present invention or a conventional thermoplastic rubber composition. Then, if required, an adhesive is coated or sprayed over the inner hose. Further, reinforcing fibers or reinforcing steel wires are braided on the inner hose by a wire braider. If required, an adhesive is coated on a reinforcing layer for bonding to an outer hose, then a thermoplastic elastomer composition according to the present invention or a conventional thermoplastic rubber composition is similarly extruded thereon by a cross-head resin extruder to form an outer hose. Finally, the mandrel is pulled out to yield a hose. Examples of an adhesive to be coated on an inner hose or a reinforcing layer include an isocyanate type, a urethane type, a phenol resin type, a resorcinol resin type, a chlorinated rubber type and an HRH type; and especially preferable are an isocyanate type and a urethane type.

EXAMPLES

(1) Raw Materials

As a halogenated isoolefin/para-alkylstyrene copolymer rubber (B) was used a brominated isobutylene para-methylstyrene copolymer rubber (hereinafter abbreviated as "Br-IPMS") produced by ExxonMobil Chemical Company under the trade name of Exxpro® MDX89-4.

As a polyamide resin (C) were used the following 3 types:
nylon 6/66: UBE Nylon 5033B (by Ube Industries, Ltd.);
nylon 6: UBE Nylon 1030B (by Ube Industries, Ltd.); and
nylon 11: Rilsan BESNOTL (by Arkema).

As a compound (D) capable of binding to a terminal amino group of a polyamide resin were used the following 3 types:
glycidol: Epiol® OH (by NOF Corp.);
p-sec-butylphenyl glycidyl ether (hereinafter abbreviated as "BPGE"): Epiol® SB (by NOF Corp.); and
2-ethylhexyl glycidyl ether (hereinafter abbreviated as "EHGE"): Epiol® EH (by NOF Corp.).

As a plasticizer (E) was used the following:
n-butylbenzenesulfonamide (hereinafter abbreviated as "BBSA"): BM-4 (by Daihachi Chemical Industry Co., Ltd.).

As a cross-linking agent were used the following 3 types:
zinc oxide: zinc oxide of JIS 3 grade (by Seido Chemical Industry Co., Ltd.);
stearic acid: stearic acid beads (by NOF Corp.); and
zinc stearate: zinc stearate (by Seido Chemical Industry Co., Ltd.).

The following antioxidant: N-(1,3-dimethylbutyl)-N'-phenyl-p-phenylenediamine: Santoflex 6PPD (by Flexsys; hereinafter abbreviated as "6PPD") was used. The 6PPD functions also as a cross-linking agent, and is an antioxidant, as well as a cross-linking agent.

(2) Production of Thermoplastic Elastomer Composition

A halogenated isoolefin/para-alkylstyrene copolymer rubber (B) was pelletized by a rubber pelletizer (by Moriyama Company Ltd.). A plasticizer (E) was mixed with a compound (D) capable of binding to a terminal amino group of the polyamide resin, and the mixture and a polyamide resin (C) were kneaded by a twin screw kneader (by Japan Steel Works, Ltd.) at a preset temperature of 230° C. for 3 minutes to produce a modified polyamide resin (A). The produced pellets of the halogenated isoolefin/para-alkylstyrene copolymer rubber (B) and modified polyamide resin (A) as well as other ingredients were kneaded by a twin screw kneader (by Japan Steel Works, Ltd.) at a preset temperature of 230° C. for 3 minutes to produce pellets of a thermoplastic elastomer composition. The respective contents were selected as shown in Table 1 and Table 2. The produced pellets were molded by a T-die extruder to 1 mm- and 0.1 mm-thick sheets for measuring physical properties.

(3) Evaluation Methods for Thermoplastic Elastomer Composition

For the produced thermoplastic elastomer composition, scorch time, fatigue durability and gas permeability were measured according to the following methods.

Scorch Time

A capillary rheometer (by Toyo Seiki Seisaku-sho, Ltd.) was filled with a sample, maintained at 230° C. for pre-determined time periods, then extruded at a shear rate of 300 $sec^{-1}$, and the extrudant appearance was monitored. The time until a nonsmooth surface appears was determined as the scorch time. Measurements were conducted at intervals of 5 minutes up to 30 minutes. The scorch time is an index of heat resistance, and a longer time is preferable.

Fatigue Durability

From a sheeted sample was punched out an JIS-Type 3 dumbbell specimen, on which cyclic fatigue stress was loaded by a Constant Strain Fatigue Tester (by Ueshima Seisakusho Co., Ltd.) at −25° C. and a strain rate of 40% up to 1 million cycles. Measurements were repeated for n=12, and cycle counts at breakage were Weibull-plotted. The count, at which the breakage probability reached 63% was determined as fatigue durability. Higher count at breakage means better fatigue durability.

Gas Permeability

The measurement was carried out according to JIS K7126 (Plastics—Film and sheeting—Determination of gas-transmission rate—Method A). Air (nitrogen/oxygen=80/20) was used as a testing gas, and measurement was conducted at 30° C. Lower gas permeability is preferable.

(4) Evaluation Results of Thermoplastic Elastomer Composition

The evaluation results are shown in Table 1 and Table 2.

TABLE 1

| | | | Example 1 | Example 2 | Example 3 | Example 4 | Example 5 | Example 6 | Example 7 |
|---|---|---|---|---|---|---|---|---|---|
| Rubber (B) | Br-IPMS | [parts by weight] | 100 | 100 | 100 | 100 | 100 | 100 | 100 |
| Resin (C) | nylon 6/66 | [parts by weight] | 75 | 75 | 75 | 60 | 60 | 60 | 50 |
| | nylon 6 | [parts by weight] | | | | | | | |
| | nylon 11 | [parts by weight] | | | | | | | |
| Compound (D) | glycidol | [parts by weight] | 0.3 | | | 0.03 | 0.06 | | 0.3 |
| | BPGE | [parts by weight] | | 0.6 | | | | | |
| | EHGE | [parts by weight] | | | 0.6 | | | 1.2 | |
| Plasticizer (E) | BBSA | [parts by weight] | 10 | 6 | 6 | 18 | 15 | 3 | 10 |
| Cross-linking agent | zinc oxide | [parts by weight] | 5 | 5 | 5 | 5 | 5 | 5 | 5 |
| | stearic acid | [parts by weight] | 0.6 | 0.6 | 0.6 | 0.6 | 0.6 | 0.6 | 0.6 |
| | zinc stearate | [parts by weight] | 0.3 | 0.3 | 0.3 | 0.3 | 0.3 | 0.3 | 0.3 |
| Antioxidant | 6PPD | [parts by weight] | 1.5 | 1.5 | 1.5 | 1.5 | 1.5 | 1.5 | 1.5 |
| Total | | [parts by weight] | 192.7 | 189 | 189 | 185.43 | 182.46 | 171.6 | 167.7 |
| Parts by weight of Compound (D) based on 100 parts by weight of Resin (C) | | [parts by weight] | 0.4 | 0.8 | 0.8 | 0.05 | 0.1 | 2 | 0.6 |
| Ratio of Rubber (B) to Resin (C) (B/(C + B) × 100) | | [% by weight] | 57 | 57 | 57 | 63 | 63 | 63 | 67 |
| Ratio of Plasticizer (E) to Resin (C) (E/(C + E) × 100) | | [% by weight] | 12 | 7 | 7 | 23 | 20 | 5 | 17 |
| Scorch time | | [min] | 25 | 30 | 30 | 15 | 15 | 30 | 20 |
| Fatigue durability | | [$10^3$ cycles] | 200 | 150 | 170 | 1000 | 700 | 300 | 800 |
| Gas permeability | | [$10^{-12}$ cc · cm/ cm$^2$ · sec · cmHg] | 9 | 10 | 9 | 21 | 18 | 7 | 19 |

TABLE 2

| | | | Example 8 | Example 9 | Example 10 | Comparative Example 1 | Comparative Example 2 | Comparative Example 3 |
|---|---|---|---|---|---|---|---|---|
| Rubber (B) | Br-IPMS | [parts by weight] | 100 | 100 | 100 | 100 | 100 | 100 |
| Resin (C) | nylon 6/66 | [parts by weight] | 42 | 36 | 18 | 60 | 60 | 60 |
| | nylon 6 | [parts by weight] | 18 | | 18 | | | |
| | nylon 11 | [parts by weight] | | 24 | 12 | | | |
| Compound (D) | glycidol | [parts by weight] | | 0.3 | | | 1.8 | |
| | BPGE | [parts by weight] | 0.6 | | | | | |
| | EHGE | [parts by weight] | | | 0.24 | 0.006 | | |
| Plasticizer (E) | BBSA | [parts by weight] | 6.5 | 8 | 8 | 10 | 3 | 26 |
| Cross-linking agent | zinc oxide | [parts by weight] | 5 | 5 | 5 | 5 | 5 | 5 |
| | stearic acid | [parts by weight] | 0.6 | 0.6 | 0.6 | 0.6 | 0.6 | 0.6 |
| | zinc stearate | [parts by weight] | 0.3 | 0.3 | 0.3 | 0.3 | 0.3 | 0.3 |
| Antioxidant | 6PPD | [parts by weight] | 1.5 | 1.5 | 1.5 | 1.5 | 1.5 | 1.5 |
| Total | | [parts by weight] | 174.5 | 175.7 | 163.64 | 177.406 | 172.2 | 193.4 |
| Parts by weight of Compound (D) based on 100 parts by weight of Resin (C) | | [parts by weight] | 1 | 0.5 | 0.5 | 0.01 | 3 | 0 |
| Ratio of Rubber (B) to Resin (C) (B/(C + B) × 100) | | [% by weight] | 63 | 63 | 68 | 63 | 63 | 63 |
| Ratio of Plasticizer (E) to Resin (C) (E/(C + E) × 100) | | [% by weight] | 10 | 12 | 14 | 14 | 5 | 30 |
| Scorch time | | [min] | 30 | 25 | 25 | phase inversion | 30 | 10 |
| Fatigue durability | | [$10^3$ cycles] | 400 | 500 | 700 | — | 3 | 1000 |
| Gas permeability | | [$10^{-12}$ cc · cm/ cm$^2$ · sec · cmHg] | 13 | 17 | 18 | — | 11 | 30 |

The thermoplastic elastomer compositions according to the present invention (Examples 1 to 10) exhibited sufficient scorch time, comfortable film formability and excellent fatigue durability and gas barrier property. On the other hand in Comparative Example 1, since the content of a compound (D) capable of binding to a terminal amino group of a polyamide resin was low, the reaction between a polyamide resin (C) and the halogenated isoolefin/para-alkyl styrene copolymer rubber (B) continued to proceed, so that the polyamide resin lost flowability causing phase inversion and the cross-linked halogenated isoolefin/para-alkylstyrene copolymer rubber formed a continuous phase, by which processing required for measurements of physical properties became impossible. In Comparative Example 2, since the content of a compound (D) capable of binding to a terminal amino group of a polyamide resin was too high, the scorch time was long, but the fatigue durability was poor. In Comparative Example 3, in which an unmodified polyamide resin was used, since the content of the plasticizer is high, processing required for measurements of physical properties was possible, but the scorch time was short.

INDUSTRIAL APPLICABILITY

The thermoplastic elastomer composition according to the present invention can be favorably used as an inner liner of a pneumatic tire. Further, the thermoplastic elastomer composition according to the present invention can be utilized for, in addition to a pneumatic tire, a barrier material in such rubber laminates requiring gas barrier property, as a hose, a fender, a rubber bag, and a fuel tank.

The invention claimed is:

1. A method for preparing a thermoplastic elastomer composition comprising a continuous phase composed of a modified polyamide resin (A) and a dispersed phase composed of a halogenated isoolefin/para-alkylstyrene copolymer rubber (B), which comprises
melt-kneading 100 parts by weight of a polyamide resin (C) with not less than 0.05 part by weight and less than 3 parts by weight of a compound (D) capable of binding to a terminal amino group of the polyamide resin at a temperature of not lower than the melting point of the polyamide resin (C) to obtain a modified polyamide (A); and
melt-kneading the modified polyamide (A) and a halogenated isoolefin/para-alkylstyrene copolymer rubber (B)
wherein the compound (D) capable of binding to a terminal amino group of the polyamide resin is a monofunctional epoxy compound.

2. The method according to claim 1, wherein the polyamide resin (C) is at least one member selected from the group consisting of nylon 11, nylon 12, nylon 6, nylon 66, nylon 6/66, nylon 6/12, nylon 6/10, nylon 4/6, nylon 6/66/12 and aromatic nylons.

3. The method according to claim 1, wherein the halogenated isoolefin/para-alkyl styrene copolymer rubber (B) is a brominated isobutylene/para-methylstyrene copolymer rubber.

4. The method according to claim 1, wherein the halogenated isoolefin/para-alkylstyrene copolymer rubber (B) is dynamically cross-linked.

5. The method according to claim 1, wherein the amount of the halogenated isoolefin/para-alkylstyrene copolymer rubber (B) is 57 to 70 parts by weight based on 100 parts by weight of the total of the polyamide resin (C) and the halogenated isoolefin/para-alkylstyrene copolymer rubber (B).

6. The method according to claim 1, further comprising a plasticizer (E) in an amount of 5 to 20 parts by weight based on 100 parts by weight of the total of the polyamide resin (C) and the plasticizer (E).

7. The method according to claim 6, wherein the plasticizer (E) is butylbenzenesulfonamide.

8. The method according to claim 4, wherein a cross-linking agent used for the dynamic cross-linking is zinc oxide.

9. The method according to claim 4, wherein a cross-linking agent used for the dynamic cross-linking is a secondary amine.

10. A pneumatic tire having an inner liner comprising the thermoplastic elastomer composition obtained by the method according to claim 1.

* * * * *